(12) United States Patent
Seo et al.

(10) Patent No.: US 7,669,319 B2
(45) Date of Patent: Mar. 2, 2010

(54) METHOD FOR FABRICATING A FLEXIBLE DISPLAY

(75) Inventors: Hyun-Sik Seo, Gyeonggi-Do (KR); Seung-Han Paek, Incheon (KR); Dae-Hyun Nam, Gyeonggi-Do (KR)

(73) Assignee: LG. Display Co., Ltd., Seoul (KR)

( * ) Notice: Subject to any disclaimer, the term of this patent is extended or adjusted under 35 U.S.C. 154(b) by 228 days.

(21) Appl. No.: 11/473,746

(22) Filed: Jun. 23, 2006

(65) Prior Publication Data

US 2006/0288571 A1    Dec. 28, 2006

(30) Foreign Application Priority Data

Jun. 25, 2005  (KR) ...................... 10-2005-0055389

(51) Int. Cl.
*H01R 9/00* (2006.01)
*H05K 3/00* (2006.01)

(52) U.S. Cl. .............................. 29/842; 29/742; 29/829; 29/831; 29/832; 156/249; 345/87; 428/403; 428/407; 428/690

(58) Field of Classification Search .................. 29/842, 29/742, 829, 831, 832; 156/249; 257/347, 257/E21.499; 345/87; 428/402, 403, 407, 428/690
See application file for complete search history.

(56) References Cited

U.S. PATENT DOCUMENTS 6,623,325 B2 *  9/2003  Tsuruoka et al. .............. 445/24
2003/0214475 A1 * 11/2003  Izumi et al. ................... 345/87

FOREIGN PATENT DOCUMENTS

JP         10-200239      *    7/1998

* cited by examiner

*Primary Examiner*—Thiem Phan
(74) *Attorney, Agent, or Firm*—Brinks Hofer Gilson & Lione

(57) ABSTRACT

A substrate transferring method and a method for fabricating a flexible display by using the same are disclosed. The method for transferring a substrate includes providing a glass substrate with a recess formed thereon, aligning a flexible substrate on the glass substrate, inserting the flexible substrate in the recess of the glass substrate, and transferring the flexible substrate-inserted glass substrate for a process. The flexible substrate is insertedly fixed in the recess of the glass substrate and transferred, or a process is performed thereon, so that the transfer method is simplified and the process stability can be obtained.

7 Claims, 6 Drawing Sheets

METHOD FOR FABRICATING A FLEXIBLE DISPLAY

This application claims the benefit of Korean Patent Application No. P2005-55389 filed on Jun. 25, 2005, which is hereby incorporated by reference.

BACKGROUND

1. Field

A method for transferring a substrate and a method for fabricating a flexible display by using the same is provided.

2. Description

Recently, the importance of a display as a visual information transfer medium has increased. The trend has been to lower the devices power consumption, increase picture quality and create a thin and light device.

Displays can be divided into a light emission type display, for example, a cathode ray tube (CRT), an electro luminescence (EL), a light emitting diode (LED), a vacuum fluorescent display (VFD), a field emission display (FED), a plasma display panel (PDP), and a non-light emission type display such as liquid crystal display (LCD) that cannot emit light by itself.

A flexible display that cannot be damaged although it is folded or rolled is anticipated to emerge as a new technique in the field of displays.

The flexible display, also called a roller display, is implemented on a thin substrate such as plastic and can be folded or rolled without being damaged. The OLED and LCD, which can be fabricated with a thickness of below 1 mm, are favored over the other types of devices.

Because the OLED emits light by itself, it has a good visibility no matter whether it is in dark or external light is introduced, and can implement high quality video with its fast response speed. The response speed is used as an important reference that determines performance of a mobile display. Currently, the OLED has the fastest response speed among the existing displays. The OLED allows an ultra-thin film designing that make diverse mobile devices slim.

The LCD is a device that displays images by using optical anisotropy. The LCD has excellent visibility, smaller average current consumption and reduced heating, compared with the existing CRT. These advantageous features make the LCD a popular device.

In order to implement a flexible display by using the LCD or the OLED, a plastic substrate or a flexible substrate such as a metal foil is used. In order to transfer the flexible substrate and perform the follow-up process, the plastic substrate is attached on a glass substrate with an adhesive. This bonding process is complicated and a plurality of laminating processes are performed, and thus there is an increased possibility that a defect will occur during productivity.

FIGS. 1A and 1D are perspective view showing the sequential process of a general method for transferring a substrate of a flexible display. The drawings sequentially show the process of attaching a plastic substrate on a glass substrate by using a general bonding technique, transferring it, and performing a follow-up process.

In order to transfer the plastic substrate and perform the follow-up process, a process that attaches the plastic substrate on the glass substrate is performed. FIG. 1A shows an adhesive 40 positioned between the plastic substrate and the glass substrate. Protection films called release papers 41 and 42 are attached on both surfaces of the adhesive 40. Before attaching the adhesive on the glass substrate the lower release paper 42 must be removed.

As shown in FIG. 1B, the lower surface of the adhesive 40, from which the lower release paper 42 has been removed, is attached on an upper surface of the glass substrate 10 through a lamination process. The adhesive 40 is attached on the glass substrate 10 by using a roll 60, and an air bubble should not be generated between the adhesive 40 and the glass substrate 10.

After the adhesive 40 is attached on the glass substrate 10, the upper release paper 41 is removed and the plastic substrate 20 is attached to the upper surface of the adhesive 40.

As shown in FIG. 1C, the plastic substrate 20 is attached on the upper surface of the adhesive 40 through another lamination process.

Because of the number of different processes required to attach the plastic substrate to the glass substrate there is an increased possibility that an air bubble can be generated during the lamination process or a blot can be generated during the process.

The plastic substrate 20 attached on the glass substrate 10 is transferred and a fabrication process is completed through several processes. After fabrication, as shown in FIG. 1D, the plastic substrate 20, is separated from the glass substrate 10.

When separating the plastic substrate 20 from the adhesive 40, attached on the glass substrate 10, several conditions should be satisfied to properly separate the layers. If the adhesive 40 is attached on the front surface of the substrates 10 and 20, the separation process become even more complicated and difficult.

If the separation process is not properly performed, the adhesive 40 may remain on the surface of the plastic substrate 20, and in this case, an additional cleaning process should be performed to remove the remaining adhesive 40.

The plastic substrate is vulnerable to heat and chemicals and thus there are additional restrictions in its processing conditions such as a process temperature when several processes are performed. As the flexible substrate, a thin (about 100 μm) light metal foil substrate, having excellent heat resistance and chemical resistance, can be used in place of the plastic substrate.

When using the metal foil substrate, the same transfer problem as the plastic substrate arises, and when the separation process is performed, the possibility that the metal foil substrate become bent is increased.

Because the surface of the substrate is rough compared with the plastic substrate, an organic insulation film should be additionally formed on the upper surface of the metal foil substrate. This requires additional steps and processes. In addition, an inorganic insulation film should be formed to prevent chemical damage to the upper and lower surface of the metal foil substrate on which the organic insulation film has been formed.

SUMMARY

A method that includes a substrate includes providing a glass substrate with a recess formed thereon; aligning a flexible substrate on the glass substrate; inserting the flexible substrate in the recess of the glass substrate; and transferring the flexible substrate-inserted glass substrate for a process.

Also provided is a method for fabricating a flexible display that includes providing a glass substrate with recesses formed thereon; aligning a flexible substrate on the glass substrate; inserting the flexible substrate into the recesses of the glass substrate and attaching the flexible substrate therein; and performing a process on the flexible substrate attached on the glass substrate.

DRAWINGS

The accompanying drawings are included to provide a further understanding of the embodiments and are incorporated in and constitute a part of this specification.

DESCRIPTION

A method for transferring a substrate and a method for fabricating a flexible display using the same according to preferred embodiments will now be described with reference to the accompanying drawings.

Figure 1A:
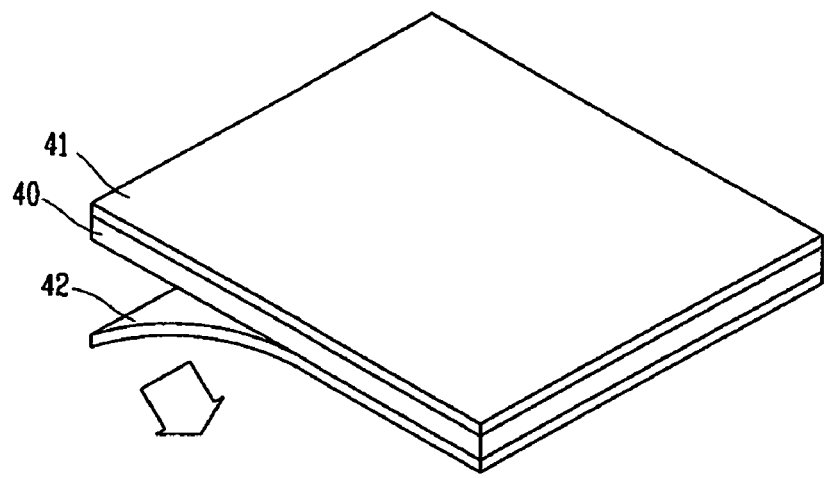
FIGS. 1A to 1D are perspective views that show the sequential process of a general method that transfers a substrate of a flexible display according to the related art.
Figure 1B:
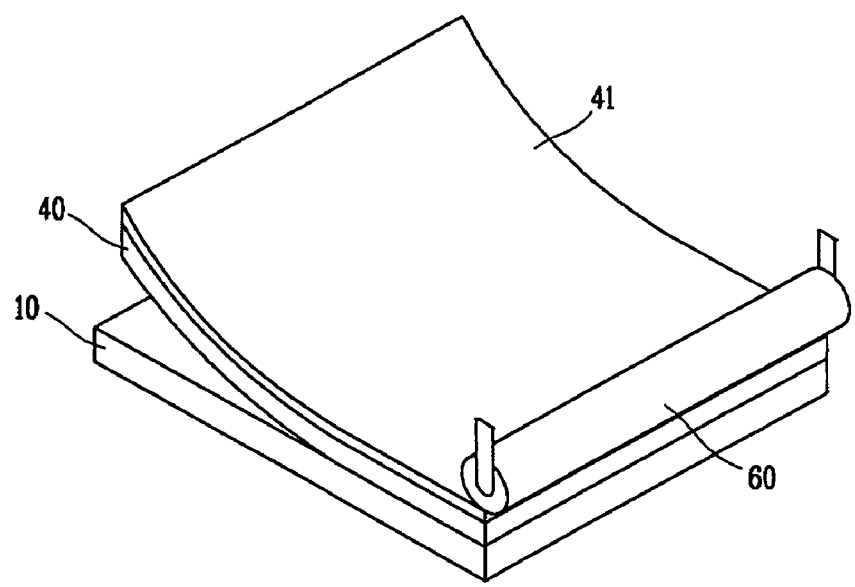
Figure 1C:
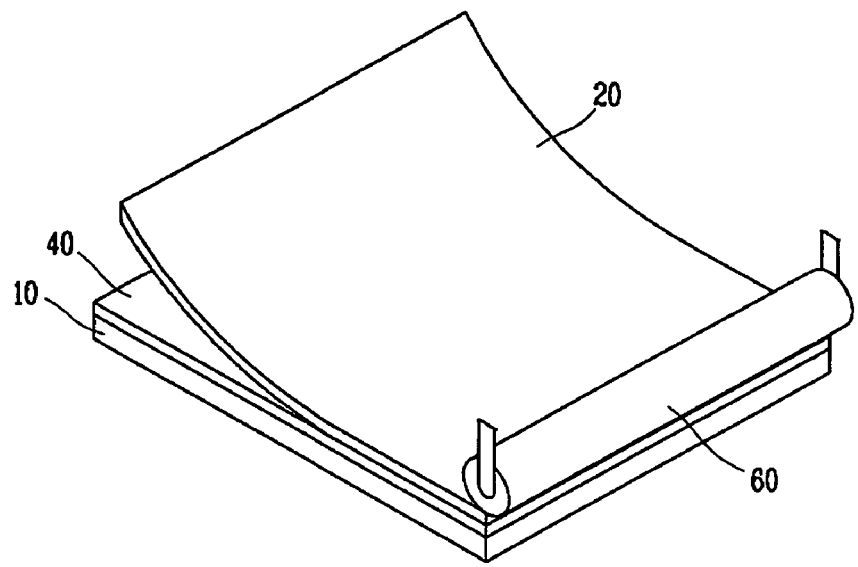
Figure 1D:
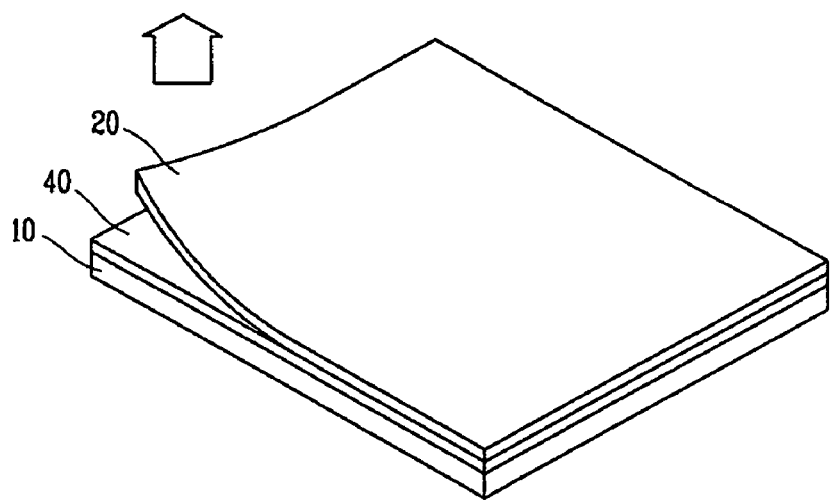
Figure 2A:
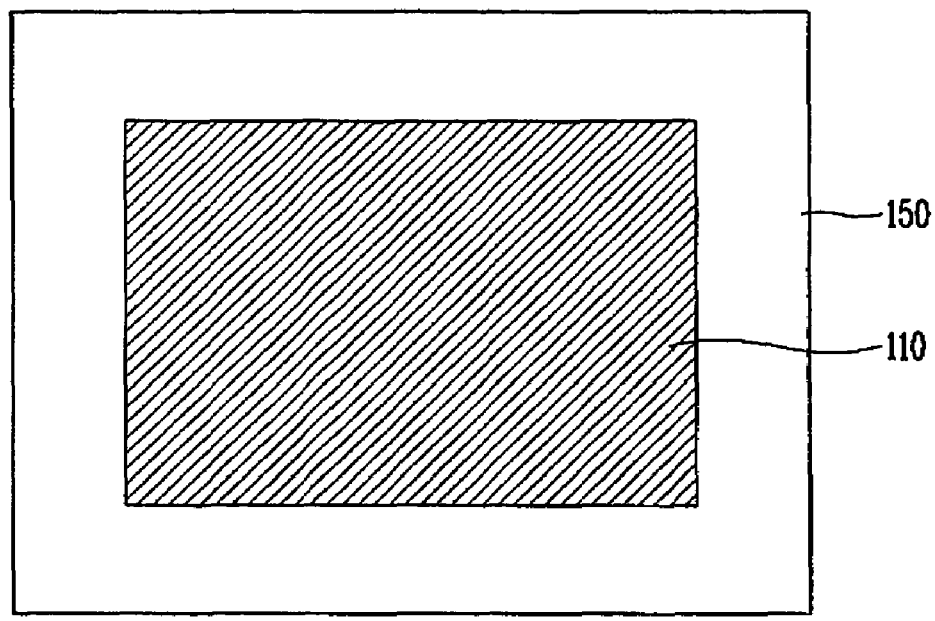
FIGS. 2A and 2B are a plan view and a sectional view that show a state that a flexible substrate is inserted in a glass substrate to be transferred.
Figure 2B:
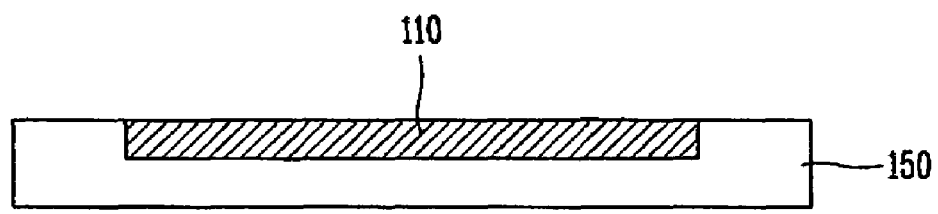

FIGS. 2A and 2B are a plan view and a sectional view that show a state that a flexible substrate is inserted in a glass substrate to be transferred.

In the present exemplary embodiment, a thin, light metal foil substrate is used as a flexible substrate, but is not limited thereto; other plastic substrates can be used.

As shown in FIG. 2A, a glass substrate 150 that transfers the metal foil substrate 110 includes an upper portion etched according to the shape of the metal foil substrate 110, and the metal foil substrate 110 is insertedly fixed in the etched recess.

The upper portion of the glass substrate 150 is etched corresponding to the thickness of the metal foil substrate 110. When the metal foil substrate 110 is inserted in the recess, the upper portion of the glass substrate 150 and the upper portion of the metal foil substrate 110 form a planarized surface at the same level.

When the recess is formed on the upper portion of the transferring glass substrate 150 and the metal foil substrate 110 is insertedly fixed in the recess. When the metal foil substrate 110 is transferred, the processes in the related art where the release paper is removed and other complicated bonding processes, for example the lamination process, are not required. Because the lamination process is omitted, there is no possibility that air bubbles or blots are generated.

FIGS. 3A to 3E are sectional views that show sequential processes of a method that transfer a substrate of the flexible display. The metal foil substrate is attached on the glass substrate, which is then transferred, on which a follow-up process is performed, which is then separated.

Figure 3A:
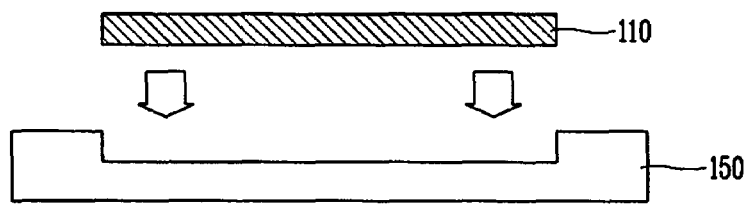
FIGS. 3A to 3E are sectional views showing sequential processes of a method that transfers a substrate of the flexible.

As shown in FIG. 3A, in order to fabricate a flexible display panel, the flexible substrate such as the metal foil substrate 110 is aligned on a hard substrate such as the glass substrate 150 and then attached thereon. The attachment means that the metal foil substrate 110 is aligned on the upper portion of the glass substrate 150, inserted into the recess, and then attached therein.

Preferably, any air present between the two substrates 110 and 150 should be removed, otherwise there is a high possibility that a defect would occur during the follow-up process.

In order to remove air between the two substrates 110 and 150, a method that forms a vacuum during attachment can be used, or heat or pressure can be used.

Figure 3B:
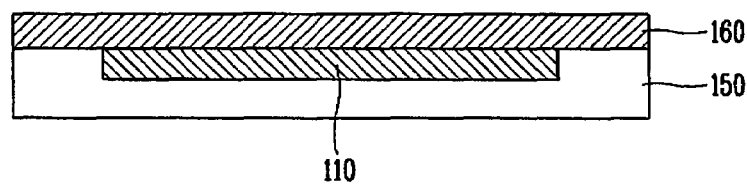

After the metal foil substrate 110 is insertedly attached in the recess of the upper portion of the glass substrate 150, in order to ensure the complete fixing of the metal foil substrate 110, as shown in FIG. 3B, an organic insulation film 160 with a certain thickness is formed on the upper surfaces of the two attached substrates 110 and 150. The organic insulation film 160 fixes the two substrates 110 and 150 and provides a smooth roughness of the surface of the metal foil substrate 110 as mentioned above.

Figure 3C:
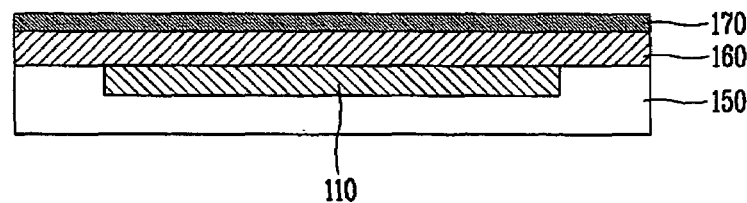

As shown in FIG. 3C, an inorganic insulation film 170 with a certain thickness is formed on the entire surface of the substrates 110 and 150 on which the organic insulation film 160 has been formed. The inorganic insulation film 170 serves to prevent the chemical substance of the metal foil substrate 110 or the organic insulation film 160 from infiltrating into the upper surface during the process.

In the present embodiment, both the organic insulation film 160 and the inorganic insulation film 170 are formed, but the embodiment is not limited thereto and only one of them can be formed.

In the present embodiment, because the metal foil substrate 110 is insertedly formed on the upper portion of the glass substrate 150, the lower surface of the metal foil substrate 110 is not exposed and thus, it is not necessary to form the inorganic insulation film on the lower surface of the metal foil substrate 110 compared with the related art bonding and transferring method.

Because it is not necessary to use the adhesive using the release paper to attach the flexible substrate and the glass substrate as in the related art, the process for removing the release paper and the plurality of lamination processes can be omitted and thus the process can be simplified.

Because the organic insulation film 160 and the inorganic insulation film 170 are formed at the upper portion of the substrate 110, fixing of the substrate 110 can be reinforced to be fixed without using any additional fixing device. Because the process for forming the protection film is simplified compared with the related art, the productivity can be enhanced and the process stability can be obtained.

Figure 3D:
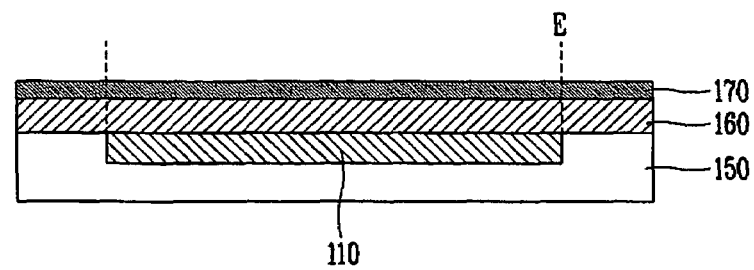
Figure 3E:

Because the metal foil substrate 110 is inserted in the glass substrate 150, the glass substrate 150 has the same thickness as a general glass substrate and has no step, so that it can be normally processed in the existing processing equipment. The metal foil substrate 110 attached on the glass substrate 150 is transferred in the attached state, a panel is fabricated by performing several processes. When the processes are finished, a process for separating the metal foil substrate 110 from the glass substrate 150 as shown in FIGS. 3D and 3E is performed.

The metal foil substrate 110 is separated by scribing the border face (E) between the two substrates 110 and 150 by using a wheel or laser, which simplifies the process. Comparatively, in the related art, because the adhesive is applied on the surfaces of the two attached substrates, the flexible substrate is separated from the glass substrate by using an external force, UV irradiation or a temperature difference. This operation is complicated, and after the separating operation, the adhesive may remain on the surface of the flexible substrate, so an additional cleaning process is necessary. After the metal foil substrate 110 is removed from the glass substrate 150, the remaining insulation film patterns 160' and 170' are removed through an etching process, whereby the glass substrate 150 can be re-used for transferring a different substrate. Because the metal foil substrate is separated from the glass substrate 150 using the scribing process, a substrate bending phenomenon as in the related art does not occur. After the process is completed, the flexible substrate can be applied as a panel for a flexible display such as the LCD, the organic EL or the electrophoretic display device. The LCD and the electrophoretic display device fabricated using the metal foil substrate will now be described with reference to the accompanying drawings.

Figure 4:
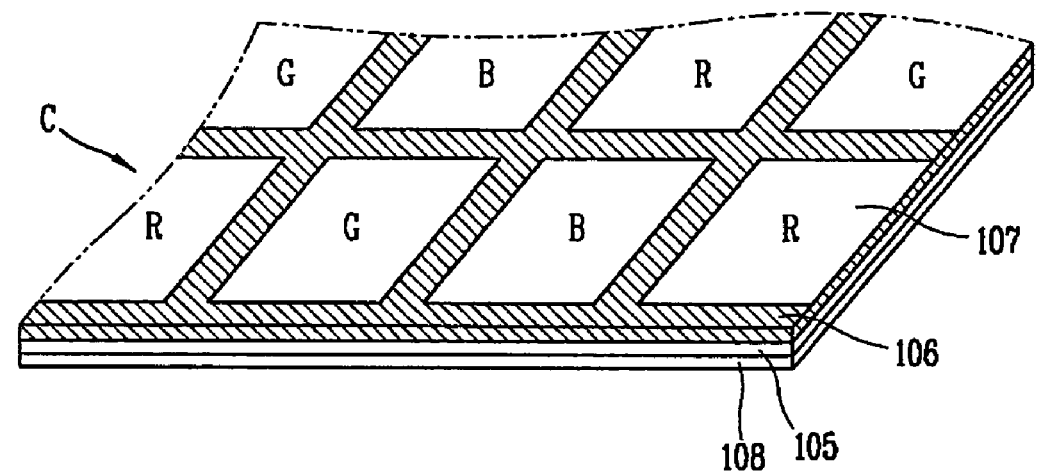
FIG. 4 is an exploded perspective view that shows the structure of a liquid crystal display.
Figure 4:
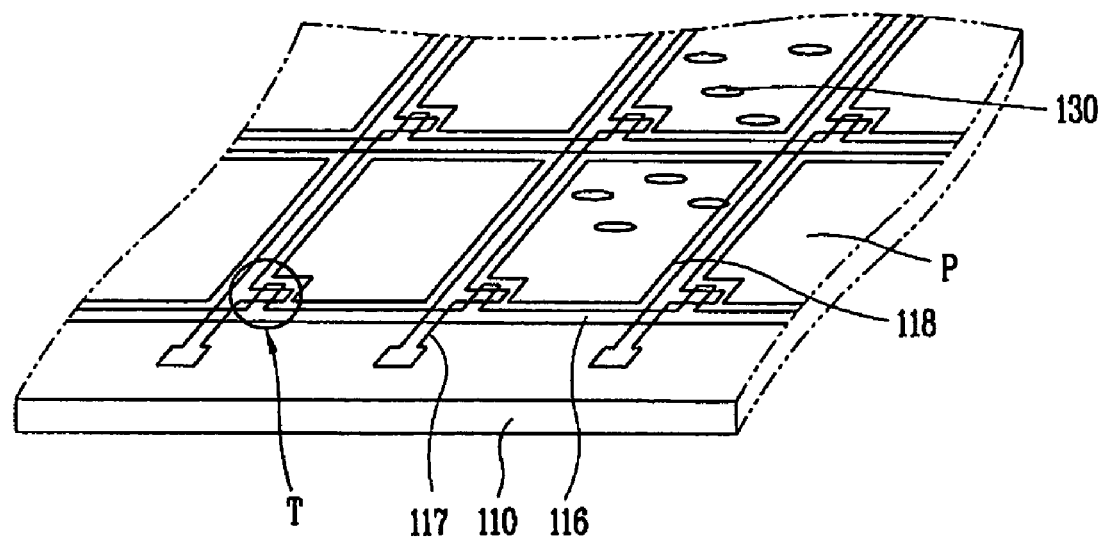

FIG. 4 is an exploded perspective view showing the structure of a liquid crystal display, in which the substrate transferring method according to the present invention can be used for fabricating a lower array substrate and an upper color filter substrate. As shown in FIG. 4, the LCD includes a color filter substrate 105, a first substrate, an array substrate 110, a second substrate, and a liquid crystal layer 130 formed between the color filter substrate 105 and the array substrate 110.

The color filter substrate 105 includes a color filter (C) including red, green and blue sub color filters 107, black matrixes 106 that divide the sub-color filters 107 and blocking light transmitted through the liquid crystal layer 130, and a transparent common electrode 108 that applies a voltage to the liquid crystal layer 140.

The array substrate 110 includes gate lines 116 and data lines 117 that are arranged vertically and horizontally to define pixel regions (P). At each crossing of the gate lines 116 and the data lines 117, a thin film transistor (TFT), a switching element, is formed. A pixel electrode 118 is formed in each pixel region (P).

The pixel region (P) is a sub-pixel that corresponds to a single sub-color filter 107. A color image is obtained by combining the three types of red, green and blue sub-color filters 107. The three red, green and blue sub-pixels form one pixel, and the TFT (T) is connected with each of the red, green and blue sub-pixels.

The method for fabricating the LCD includes an array process for forming the array substrate, a color filter process for forming the color filter substrate, and a cell process for forming unit liquid crystal panels by attaching the array substrate and the color filter substrate. The flexible substrate such as the metal foil substrate is used as the array substrate and the color filter substrate. The flexible substrate is insertedly fixed in the glass substrate and then transferred to the array process and the color filter process, or other processes that are performed.

Figure 5A:
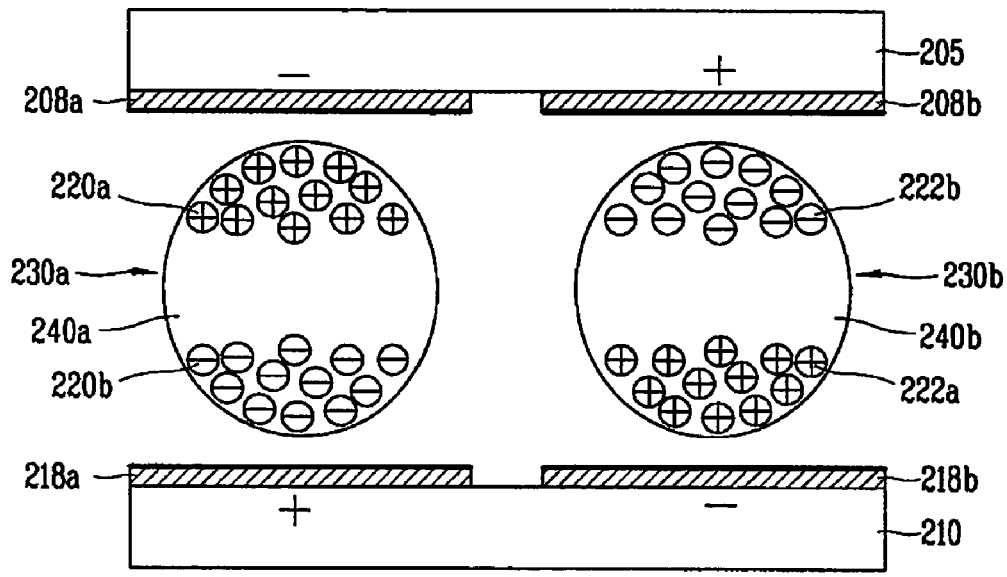
FIG. 5A is a sectional view that shows the structure of an electrophoretic display device.

FIG. 5A is a sectional view showing the structure of an electrophoretic display device, in which a cell structure of the electrophoretic display device using electronic ink is shown.

A digital paper display (DPD), the electrophoretic display device, is developed as the next-generation display device anticipated to succeed the LCD, the plasma display panel and the organic EL device. Electronic paper is a display device that displays a character or an image on a flexible substrate such as thin plastic in which a few hundreds of beads spread in oil holes. The electronic paper can be re-cycled a few hundreds of times, and is expected to replace the existing printed medium such as books, news papers, and magazines in the future. Compared with the existing flat panel display device, the electronic paper incurs reduced production unit cost, has a high quality image, wide viewing angle and a memory function that characters are not completely gone with no power, so that there is high possibility that it can be widely used for a public bulletin board, advertisements, electronic books, or the like.

The electrophoretic display device includes an upper substrate 205 and a lower substrate 210 installed to be parallel with a certain distance therebetween. The upper substrate 205 and the lower substrate 210 can be formed as one of plastic or metal foil.

A pair of upper transparent electrodes 208a and 208b are formed in parallel on the front surface of the upper substrate 205, and a pair of lower transparent electrodes 218a and 218b are formed in parallel on the front surface of the lower substrate 210 corresponding to the pair of upper transparent electrodes 208a and 208b.

A polarity control signal controlled by an external driving unit (not shown) is supplied to the transparent electrodes 208a and 208b and 218a and 218b. A film in which organic capsules 230a and 230b with a diameter of about 150 μm~200 μm are uniformly distributed is formed between the pairs of the transparent electrodes 208a and 208b and 218a and 218b. Black and white pigments including particles with a diameter of about 0.51 μm~1 μm are distributed in the suspension in the capsules 230a and 230b.

Light emission process of the electrophoretic display device constructed as described above will be described. When a negative polarity field is applied, the white particles move to the upper surface of the first capsule 230a, namely, in the direction that users can view. At this time, a white color is displayed on the surface of the portion to which the white particles have moved. Simultaneously, the opposite field pulls the black particles to the hidden lower surface of the second capsule 230b. When this process is changed, the black particles appear on the upper surface of the capsule that displays the black color on the display point of the surface.

Figure 5B:
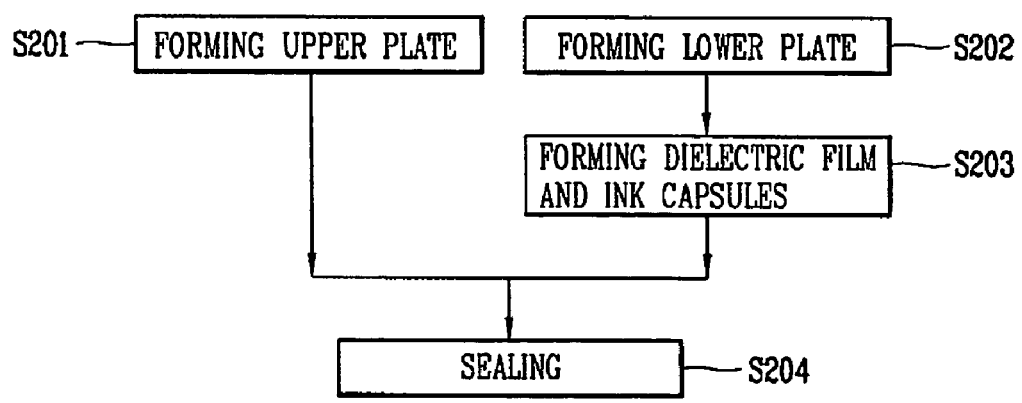
FIG. 5B is a flow chart that illustrates the processes of the electrophoretic display device in FIG. 5A.

The electrophoretic display device using the electronic ink is fabricated by the fabrication process as shown in FIG. 5B. FIG. 5B is a flow chart illustrating the processes of the electrophoretic display device in FIG. 5A. With reference to FIGS. 5A and 5B, first as stated above, in a state that the flexible substrate is inserted in the glass substrate, a plurality of processes are performed thereon to form the upper and lower substrates 205 and 210 (acts S201 and S202).

The pairs of transparent electrodes 208a, 208b, 218a and 218b made of the transparent conductive material such as indium tin oxide (ITO) are formed on the upper portion of the upper substrate 205 and the lower substrate 210.

After the upper and lower substrates 205 and 210 are formed, a dielectric film (not shown) and ink capsules 230a and 230b are formed on the lower substrate 210 (step S203). During the process, for example, ink, organic ink or inorganic ink can be used; however, inorganic ink is typically used.

The ink is inserted into fine capsules 220a, 220b, 222a and 222b. The capsules 220a, 220b, 222a and 222b include a few millions of black and white particles. The material of the black inorganic particles is a carbon group and has a negative polarity, and as the material of the white inorganic particles, titanium oxides (TiO20) is used and has a positive polarity.

When a field is applied thereto by the electrophoresis, if a positive polarity voltage is applied, carbon particles are moved to an anode and the titanium oxide particles are moved to the cathode, the opposite polarity, to thereby display black and white colors. The electrophoresis refers to movement of materials charged according to the influence of electric field in a fluid medium.

When the ink is capsulized, the capsules 220a, 220b, 222a and 222b are distributed in the slurry, namely, in the suspensions 240a and 240b. The suspensions 240a and 240b are printed on the surface of the lower substrate 210 through, for example, screen printing, roll coating and spin coating. After the printing process, a curing process is performed at a temperature of about 100° C.~200° C.

When the dielectric film and the ink capsules 230*a* and 230*b* are formed, a sealing process is performed to attach the lower substrate 210 and the upper substrate 205 with the ink capsules 230*a* and 230*b* formed therebetween.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for fabricating a flexible display comprising:
    providing a glass substrate with recesses formed thereon, wherein the recess is formed on an upper portion of the glass substrate etched according to a shape of a flexible substrate;
    aligning the flexible substrate on the glass substrate;
    inserting the flexible substrate into the recess of the glass substrate and attaching the flexible substrate therein;
    forming an organic insulation film on an upper portion of the attached glass and flexible substrates in order to ensure the complete fixing of the flexible substrate;
    forming an inorganic insulation film on the flexible substrate attached on the glass substrate; and
    separating the flexible substrate from the glass substrate by scribing a vertical border face (E) between the glass substrate and the flexible substrate.

2. The method of claim 1, wherein in the step of aligning the flexible substrate, the flexible substrate is aligned in the recess of the glass substrate.

3. The method of claim 1, wherein the flexible substrate is formed as a metal foil substrate.

4. The method of claim 1, further comprising;
    forming the inorganic insulation film on the organic insulation film to prevent a chemical substance of the flexible substrate or the organic insulation film from infiltrating into the upper surface during the process.

5. The method of claim 1, wherein the process comprises an array process that forms switching elements on the flexible substrate.

6. The method of claim 1, wherein the process comprises a color filter process that forms color filters on the flexible substrate.

7. The method of claim 1, wherein the process comprises an electrophoresis process that forms electronic ink on the flexible substrate.

* * * * *